Patented Dec. 31, 1929

1,741,305

UNITED STATES PATENT OFFICE

ALPHONS O. JAEGER, OF ST. LOUIS, MISSOURI, ASSIGNOR TO THE SELDEN COMPANY, OF PITTSBURGH, PENNSYLVANIA, A CORPORATION OF DELAWARE

PURIFICATION OF AROMATIC HYDROCARBONS

No Drawing. Application filed February 4, 1926. Serial No. 86,099.

This invention relates generally to the production of purified aromatic hydrocarbons, especially benzene and its homologues such as toluene, xylenes, etc. More particularly, the invention relates to the recovery of aromatic hydrocarbons of high purity from light oils produced by the distillation of coal tar, oil tar and other similar bodies as well as the light oils produced by washing coal gas which are unusually rich in benzene. These distillates which are of similar chemical composition will hereinafter be referred to broadly as coal tar distillates.

In the ordinary production of commercial benzene and toluene the low boiling fraction of coal tar, oil tar or similar products, the so-called "light oils" are separated into light benzenes, heavy benzenes and carbolic oils by fractional distillation. The light benzenes are treated to separate bases and acid oils and are then washed with strong sulfuric acid. Sometimes the light benzenes are separated into fractions after the removal of acids and bases and the individual fractions are washed with sulfuric acid.

The sulfuric acid wash is usually carried out in stages, the crude benzenes being first treated with partially spent acid then with several successive portions of fresh strong acid. In each stage the acid sludge separates on standing and must be drawn off rapidly as it tends to thicken due to the presence of resinifiable substances.

The amount of acid required usually varies from 6 to 10% in the case of the lighter fractions while in the case of solvent benzene fractions the quantity may be considerably higher. The loss in washing is about equal to the amount of acid used.

The waste acid has only a limited utility and the acid resins separated from it are of little value or worthless.

The acid washed benzene fractions, toluene fractions, etc., are washed with water or a dilute alkali solution and rectified forming commercial benzenes, or toluenes, etc.

These washed products still contain noticeable amounts of impurities and even technically pure benzenes, toluenes, etc., which have been subjected to sharper fractionation still contain small amounts of aliphatic hydrocarbons, saturated and unsaturated, and various sulfur compounds such as compounds of the nature of thiophenes, carbon bisulfide etc. Other impurities are also present and vary with the source of the crude distillate.

For many purposes, the presence of the said impurities, some of which tend to polymerize to resins, is undesirable, especially where the benzene, or toluene or xylene, etc., containing such, are to be used in reactions which favor polymerization. Carbondisulfide, thiophenes, and similar sulfur compounds are also detrimental in many cases, notably when the benzene or toluene or xylene or their derivatives are to be used for catalytic purposes especially hydrogenation and reduction.

It is one of the objects of the present invention to replace the wasteful treatment of crude benzenes with sulfuric acid and the alkali washings where phenols are present in small quantities, and to substantially remove in a single step not only the basic and unsaturated impurities but the thiophene compounds $CS_2$, other organic and inorganic sulfur compounds, phenols and aliphatic hydrocarbons as well.

It is a further advantage of the present invention that the impurities are separated in a form in which they can be utilized to produce resins, solvents and other bodies. Large losses of aromatic hydrocarbons such as take place in the old sulfuric acid wash process are also avoided.

According to the present invention, the crude light benzene or light benzene fractions, before or after the removal of acids and basic compounds, are treated with chlorine or chlorine yielding bodies, with or without chlorine carriers, under suitable conditions. The aliphatic compounds, saturated and unsaturated, and thiophene compounds as well as the other impurities, such as $CS_2$ and other sulfur compounds, organic and inorganic, are preferentially attacked by the chlorine and form for the most part high boiling compounds from which the aromatic hydrocarbons can be readily distilled off in a highly purified state. Bromine or brominating agents may also be used but iodine does not act satisfactorily and for the purpose of this invention iodine is not an active halogen and the term "active halogen" when used in the specification and claims excludes iodine and iodine yielding substances.

The aliphatic hyrocarbons, for example, pentane, hexane, amylene, hexylene, heptylene octylene, the alicyclic compounds, such as cyclopentadiene, dicyclopentadiene, di and tetrahydrobenzene, the heterocyclic compounds as for example, pyrrol, pyridin, thiophene, thiotolene, etc., are readily attacked by active halogens to form halogen addition or substitution products or to form condensation or polymerization products which may or may not contain halogens. The aromatic hydrocarbons of the benzene series are much more resistant to chlorine and bromine and by adjusting the treatment, the impurities can be removed almost quantitatively without any substantial loss of benzene hydrocarbons. Even the phenols and basic compounds which are present in the crude benzene in amounts too small to warrant their recovery are much more reactive with chlorine and bromine than the corresponding hydrocarbons and are transformed into high boiling substances.

$CS_2$ and other sulfur compounds in the crude benzene are chemically transformed by the halogen under suitable working conditions, particularly in the presence of specific halogen carriers such as iodine. For example, $CS_2$ is changed into $CCl_4$ which is difficult to separate by fractional distillation but which is chemically relatively inert and may be present in small amounts in the final products without rendering them unfit for many purposes such as the production of compounds for use in catalytic reactions, such as the reduction of aromatic nitrocompounds to amines.

Elemental chlorine, gaseous or liquid, may be used alone or in the form of solutions or bodies yielding chlorine may be used such as aqua regia, phosgene, sulfuryl chloride, nitrosyl chloride, hypochlorites, chlorides, etc., or hydrochloric acid may be used in the presence of an oxidizer. Similarly, bromine or brominating agents can be used and mixtures of chlorinating and brominating agents may also be used.

Liquid chlorine is particularly effective where the amount of impurities is large as the evaporation of the liquid absorbs large quantities of heat and prevents local rise of temperature due to the reaction of the chlorine with the impurities, which reactions are for the most part exothermic. A local rise in temperature is undesirable in many cases particularly where it is desired to prevent the chlorination of side chains as side chain chlorination is accelerated by a rise in temperature.

Mixtures of the above chlorinating agents with or without elementary chlorine may also be used in the presence or absence of chlorine carriers, and mixtures of chlorinating and brominating agents may also be used.

Sulfur or sulfur compounds such as sulfur halides, sulfuryl chloride, thionyl chloride, benzene sulfochloride and homologues, are preferably used singly or together as halogen carriers as they preferentially catalyze the halogenation and particularly the chlorination of acyclic, alicyclic and heterocyclic compounds, $CS_2$ and other sulfur compounds, organic and inorganic, while having but little effect on the halogenation of aromatic hydrocarbons. Nitrosyl chloride may also be used.

The following halogen carriers may also be used singly or together: iron, ferric chloride or bromide, aluminum, aluminum halides, halides of antimony, tin, gold, tellurium, zirconium, uranium, vanadium, bismuth, molybdenum, zinc, animal charcoal, wood charcoal or any other well known halogen carriers. The reaction may also be advantageously carried out in the presence of light, heat, or silent electric discharge. Combinations of the chemical mixtures enumerated above and the physical characters such as light, heat and the like may be used. Chemical compounds of catalysts which preferentially catalyze the halogenation of aliphatic compounds and those which catalyze the halogenation of aromatic compounds may also be used in some cases.

The purification, particularly of fractions which contain a very high percentage of benzene with only small amounts of toluene, may take place in the vapor phase. It is an advantage of the vapor phase treatment, especially in the presence of light, that toluene is also attached and transformed into high boiling constituents.

The purification may be carried out in batches or as a continuous process in any suitable apparatus. Alkaline compounds of the alkali and alkaline earth metals may be added in small quantities to neutralize any HCl or other acid given off and to protect the apparatus from corrosion. The addition may take place before or after the halogenation.

The mixture of higher boiling by-products produced in the present process after distilling off the benzene or benzene hydrocarbons may be utilized in any desired manner, and valuable products such as resin solvents may be recovered therefrom.

The invention will be further illustrated by the following specific examples.

*Example 1*

Light oil is fractionated and a crude benzene fraction boiling up to 105° C. is taken. This fraction contains about 4% of impurities consisting of a mixture of the compounds described above. The crude benzene without any further treatment is subjected to the action of about 6-8% by weight of gaseous chlorine at room temperature. The chlorine is introduced in a uniform rapid stream into the crude benzene which is stirred vigorously. Preferably, a chlorine distributor is used to secure uniform distribution of chlorine. About 1 to 3% of sulfur is added as a chlorine carrier. The solution assumes a dark coloration and the chlorine is absorbed quantitatively with but little evolution of HCl.

After the reaction is finished, the mixture is washed with water and with dilute alkali, dried and the benzene distilled off. One column distillation is usually sufficient. Or if desired, finely divided soda ash is added in amounts about equivalent to the chlorine absorbed.

The benzene hydrocarbons produced are of high chemical purity and are suitable for the production of derivatives to be used in catalytic reactions. The yield amounts to about 97 to 99% of the theoretical.

*Example 2*

A crude benzene fraction boiling from 105°-120° C. and containing about 8-10% of impurities is placed in a vessel and a small amount of calcium carbonate is added. A mixture of chlorine and air is passed in through a chlorine distributor until a sample which is distilled off no longer colors sulfuric acid on standing.

When the reaction is complete the chlorine is shut off and air passes through for a short time to remove any traces of HCl and chlorine remaining. The air is then shut off and the toluene fraction distilled over in a state of high purity. The product is purer than commercial toluene which is produced by the ordinary treatment with sulfuric acid and is suitable for the production of derivatives to be used in catalytic reactions. The yield is from 97-99% of the theoretical. One distillation is usually sufficient.

*Example 3*

A crude benzene fraction as described in Example 1 is treated by passing in about 8% of chlorine, mixed with $SO_2$, through a chlorine distributor, the mixture being vigorously stirred throughout the chlorination. The sulfur dioxide appears to hasten the reaction, probably due to the formation of sulfuryl chloride which is an excellent chlorine carrier for aliphatic, alicyclic and heterocyclic compounds, and also catalyzes the chlorination of sulfur compounds. The chlorine is absorbed rapidly and quantitatively. After all the chlorine is absorbed the mixture is neutralized and washed and the benzene hydrocarbons distilled off as described in Example 1. The yield is about 99% of the theoretical and the product is of high purity, being considerably purer than commercial benzene produced by washing with surfuric acid.

*Example 4*

1000 lbs. crude benzene fraction, boiling from 105° to 120° C. containing about 8% impurities is placed in a vessel and about 100 lbs. of sodium chlorate solution is added and about 150 lbs. of concentrated hydrochloric acid is slowly introduced with vigorous agitation. The reaction mixture is then neutralized and washed and the toluene fraction distilled off. The yield of high grade hydrocarbon is about 97% of the theoretical.

*Example 5*

A crude benzene fraction boiling up to 105° C. and containing 4 to 5% of impurities is rapidly chlorinated by passing in about 8-10% of gaseous chlorine in the presence of about 1% of iron filings and is heated up slowly. The mixture is vigorously agitated during the chlorination and is subsequently neutralized and washed and the benzene hydrocarbons distilled off as described in Example 1. The yield of hydrocarbon is about 95-97% and the product is of high purity, being considerably better in quality than the commercial product produced by washing with sulfuric acid and being well suited for the preparation of derivatives to be used in catalytic reactions as sulfur compounds are eliminated or transformed into relatively inactive compounds.

*Example 6*

A crude benzene fraction boiling up to 105° C. and containing about 8% of impurities is treated as in Example 5 but 1 to 3% of finely divided iron sulfide is used as a chlorine carrier. The yield of highly purified hydrocarbon is about 97 to 99%.

*Example 7*

A high boiling light oil fraction containing mainly solvent naphtha, (xylenes and similar bodies) together with from 40 to 50% of impurities, mostly cumaron and indene bodies, is placed in a receptacle provided with an efficient agitator and a chlorine distributor consisting of a perforated coil. 1 to 3% of benzene sulfochloride is added and from about 8 to 20% of gaseous chlorine is passed. The quantity of chlorine required depends on the particular sample of crude oil. In general, the chlorination should be continued until a sample distilled off gives a clear colorless reading in the standard sulfuric acid test. When the chlorination is finished, the mixture is neutralized and washed as in Example 1 and the solvent naphtha is distilled off in a highly purified state of chemical purity, the yield amounting to about 95-98% of the theoretical. A large amount of light colored liquid remains in the distilling vessel and is drawn off. This residue consists largely of cumaron and indene bodies which may be partly chlorinated or polymerized. This product can be used as a raw material for the preparation of cumaron and indene resins and is superior to residues produced by washing with sulfuric acid as the chlorine treatment does not tend to decompose the cumaron and indene bodies. In many cases, the residue is sufficiently resinified so that it can be directly used without further polymerization in which case it is usually desirable to wash the product with water to remove water soluble compounds.

Example 8

A low boiling crude benzene fraction containing about 2 to 3% of toluene and impurities as described above is distilled through a column and gaseous chlorine is introduced into the bottom of the column and the rate of introduction regulated so that the distillate after washing gives no color in the standard sulfuric acid test. The distillate can be collected and washed with water or dilute alkali, or the vapors may be condensed in a wash tower or the HCl may be removed in any other suitable manner. The process can be made continuous by adding fresh amounts of crude benzene to the still and removing the chlorinated impurities from the bottom of the still from time to time through a drain pipe. The chlorinated toluene may be recovered from the waste sludge when it is present in sufficient amounts to warrant its recovery. The other components of the sludge may also be utilized for various purposes as described above. The yield of highly purified benzene is from 97 to 99% of the theoretical.

Example 9

A low boiling crude benzene fraction is distilled as described in Example 8, but the vapors in the column are illuminated with a quartz mercury vapor lamp or other source of light rich in ultra-violet rays. The chlorination is more rapid and the distillation and chlorine introduction can be speeded up or if desired a shorter, less efficient column can be used. The distillate is washed as described in the foregoing examples and the yield of highly purified benzene is about 98 to 99% of the theoretical. The transformed impurities are removed as described in Example 8.

Example 10

A low boiling crude benzene fraction containing from 2 to 5% of toluene and impurities as described, is purified as described in Example 9 but instead of introducing chlorine alone into the column a mixture of chlorine and a small amount of sulfur dioxide is introduced. The sulfur dioxide and chlorine react to form sulfuryl chloride which strongly catalyzes the chlorination of impurities and permits a considerable increase in output from the same apparatus. The sulfuryl chloride which boils at a relatively high temperature flows back into the still where it is removed with the waste sludge. Small amounts of unreacted sulfur dioxide may at times pass over into the distillate but are removed by the alkaline wash.

Example 11

A low boiling crude benzene fraction is purified as described in Examples 8 and 9, but instead of using fragments of inert materials in the column, iron fragments are used. The iron acts as a catalyst and permits a rapid purification, but care should be taken not to use a great excess of chlorine over that required to combine with the impurities and with the toluene as in the presence of sufficient chlorine iron catalyzes the chlorination of benzene itself.

Example 12

A low boiling crude benzene fraction containing about 4% of impurities is placed in a chlorination vessel provided with an agitator and liquid chlorine distributor. Liquid chlorine is then passed in in a fine stream with constant agitation until about 6 to 8% by weight of chlorine has been absorbed. The flow of chlorine is then shut off and the mixture washed with water and then with dilute alkali. The washed product is then dried and benzene distilled off, giving a yield of benzene hydrocarbons of high chemical purity amounting to about 97 to 99% of the theoretical. Instead of washing with water and dilute alkali, finely divided soda ash may be added in amount about equal to the chlorine absorbed.

Example 13

A crude benzene fraction containing toluene is treated as in Example 12, except that about 1 to 3% of sulfur is added after the chlorine has been passed in and agitation is continued. The solution assumes a dark color and the chlorine is absorbed practically quantitatively. The product is then treated with alkali as described in Example 12 and toluene distilled off in a state of high chemical purity.

Example 14

A low boiling crude benzene fraction is placed in an acid-resistant vessel provided with an agitator and a liquid chlorine distributor and about 1 to 2% of sulfur and about 1% of iron filings are added. Liquid chlorine is passed in repeatedly until 6 to 8% of chlorine is absorbed. The acid produced is neutralized as described in Example 12 and a high yield of benzene of great chemical purity is obtained.

Example 15

A low boiling crude benzene fraction such as is used in Example 14 is mixed with about 1 to 3% of sulfur in an acid-resistant vessel provided with an agitator and a liquid chlorine distributor and also provided with means for illuminating the interior of the vessel with a mercury vapor lamp. Agitation is started and liquid chlorine is passed in repeatedly in a fine stream until about 6 to 8% of chlorine is absorbed. The solution becomes dark and after the chlorine has been absorbed, finely divided soda ash is added in suitable amounts in order to neutralize any acids evolved. The benzene is then distilled off and is of high chemical purity, being also substantially free from toluene.

It will be seen, therefore, that the present invention constitutes a simple and effective method of purifying crude oil tar distillates containing liquid hydrocarbons of the benzene series. It is also possible to produce benzene hydrocarbons of high chemical purity in a single step in almost quantitative yields and the products which are much purer than those prepared by washing with sulfuric acid, are suitable for the production of derivatives to be used in catalytic reactions. It is thus an important advantage of the present invention that benzene hydrocarbons can be produced in a single step and at a cost comparable with ordinary commercial products but which are of sufficient purity to serve as the raw material for which derivatives as nitrobenzene and its homologues for use in catalytic reactions. The by-products of the present process are novel products and contains valuable constituents such as acid resins or resin forming substances in a comparatively undecomposed condition. Other valuable constituents such as chlorinated acyclic and alicyclic hydrocarbons and similar solvent bodies may also be recovered and in some cases the recovery of halogenated toluenes is possible.

In the claims, the term "crude", when applied to coal tar distillates or other mixtures is intended to cover only distillates or mixtures which have not been purified by washing with strong sulfuric acid. The term "chlorinating agent" is intended to cover chlorine or any compound or mixture of compounds which yield chlorine either in a nascent state or as gaseous or liquid chlorine. Similarly, "halogenating agent" is used in the broad sense to cover halogens and compounds which yield halogens.

The expression "halogenating agent" is, of course, used only to cover agents which contain active halogens. As has been stated above, iodine is not an active halogen for the process of the present invention and is, therefore, excluded from the scope of the term "halogenating agent" as used in the claims. The expression "sulfur substance" will be used in the claims to cover sulfur itself or any of its active compounds or mixtures thereof.

In the claims, the word "catalyst" is used to cover agencies which promote reaction of halogen with the impurities or other components of the mixtures treated whether the agency is physical, for example light, or chemical. The word "carrier" is limited to a chemical substance or mixture of chemical substances which act as catalysts and does not include physical agencies such as light, heat, pressure, silent electric discharge and the like.

In the claims the expressions "crude mixture" and "crude coal tar distillate" are used in the technical sense current in the coal tar distillation art and refer only to distillates or mixtures which have not been given a refining treatment which transforms them into salable commercial products. It should be understood that the above terms are used strictly in their narrow technical meaning and do not apply generally to mixtures which may contain impurities, since commercial benzol and other commercial aromatic hydrocarbons are normally not pure and may sometimes contain impurities in amount as great as some of the crude distillates, but they have been subjected to the normal refining treatment and are commercially salable products and are not known in the art as crude mixtures or crude distillates. The treatment of such commercially purified products or mixtures is, of course, excluded from the scope of the claims.

Having thus described my invention, what I claim as new is:

1. The process of recovering highly purified aromatic hydrocarbons from crude mixtures containing as impurities acyclic, alicyclic, heterocyclic compounds, sulfur compounds, organic or inorganic, or phenols which comprises partially halogenating and removing the unreacted aromic hydrocarbons.

2. The process of purifying crude coal tar distillate which comprises partially halogenating the distillate, the halogenation being sufficient to substantially attack organic sulfur compounds present in the distillate.

3. The process of recovering highly purified aromatic hydrocarbons from crude mixtures containing as impurities acyclic, alicyclic heterocyclic compounds, sulfur compounds, organic or inorganic, or phenols which comprises adding sufficient active halogenating agent to react with the impurities leaving the aromatic hydrocarbons substantially unattacked.

4. The process of purifying crude coal tar distillates which comprises partially halogenating the distillates in the presence of a halogenation catalyst, the halogenation being sufficient to substantially attack organic compounds present in the distillates, and other than aromatic hydrocarbons.

5. The process of recovering highly purified aromatic hydrocarbons from crude mixtures containing as impurities acyclic, alicyclic, heterocyclic compounds, sulfur compounds, organic or inorganic, or phenols which comprises adding sufficient active halogenating agent to react with the impurities in the presence of a halogenation catalyst, the aromatic hydrocarbons being substantially unattacked.

6. The process of purifying crude coal tar distillates which comprises partially halogenating the distillates in the presence of a halogen carrier, the halogenation being sufficient to substantially attack organic sulfur compounds present in the distillates.

7. The process of recovering highly purified aromatic hydrocarbons from crude mixtures containing as impurities acyclic, alicyclic, heterocyclic compounds, sulfur compounds, organic or inorganic, or phenols which comprises adding sufficient active halogenating agent to react with the impurities in the presence of a halogen carrier, the aromatic hydrocarbons being substantially unattacked.

8. The process of purifying crude coal tar distillates which comprises partially halogenating the distillates in the presence of a halogen carrier which preferentially catalyzes the halogenation of aliphatic compounds and inorganic and organic sulfur compounds.

9. The process of recovering highly purified aromatic hydrocarbons from crude mixtures containing as impurities acyclic, alicyclic, heterocyclic compounds, sulfur compounds, organic or inorganic, or phenols which comprises adding sufficient active halogenating agent to react with the impurities in the presence of a halogen carrier which preferentially catalyzes the halogenation of aliphatic compounds, the aromatic hydrocarbons being substantially unattacked.

10. The process of recovering highly purified aromatic hydrocarbons from crude mixtures containing as impurities acyclic, alicyclic, heterocyclic compounds, sulfur compounds, organic or inorganic, or phenols which comprises adding sufficient active halogenating agent to react with the impurities in the presence of a mixture of halogen carriers which preferentially catalyze the halogenation of aliphatic and sulfur compounds and carriers which catalyze the halogenation of aromatic compounds, carbon disulfide and other sulfur compounds, the aromatic hydrocarbons being substantially unattacked.

11. The process of recovering highly purified aromatic hydrocarbons from crude mixtures containing as impurities acyclic, alicyclic, heterocyclic compounds, sulfur compounds, organic or inorganic, or phenols which comprises treating the mixture in the presence of a sulfur substance not originally present, with enough active halogenating agent to react with the impurities while leaving the aromatic hydrocarbons substantially unattacked.

12. The process of purifying crude coal tar distillates which comprises introducing enough active halogenating agent to react with the impurities in the presence of a sulfur substance not originally present, while leaving the aromatic hydrocarbons substantially unattacked.

13. The process of purifying crude coal tar distillates which comprises partially chlorinating the distillates, the halogenation being sufficient to substantially attack organic sulfur compounds present in the distillates.

14. The process of purifying crude coal tar distillates which comprises subjecting the product to the action of sufficient chlorinating agent to react with the impurities but insufficient to substantially attack aromatic hydrocarbons and removing the unreacted aromatic hydrocarbons from the reaction mixture.

15. The process of removing practically acyclic, alicyclic together with heterocyclic compounds, sulfur compounds, organic or inorganic, and phenols from crude mixtures containing them in conjunction with aromatic hydrocarbons which comprises subjecting the mixture to the action of sufficient chlorinating agent to react with practically all the compounds except the aromatic hydrocarbons and removing the latter from the mixture in a highly purified state.

16. The process of purifying crude coal tar distillates which comprises partially chlorinating the product, neutralizing and removing unreacted aromatic hydrocarbons by distillation, the halogenation being sufficient to substantially attack organic sulfur compounds present in the distillates.

17. The process of purifying crude coal tar distillates which comprises subjecting the product to the action of sufficient chlorinating agent to react with the impurities but insufficient to substantially attack aromatic hydrocarbons, neutralizing and removing the unreacted aromatic hydrocarbons from the reaction mixture by distillation.

18. The process of purifying crude coal tar distillates which comprises partially chlorinating the distillates in the presence of a chlorine catalyst.

19. The process of recovering highly purified aromatic hydrocarbons from crude mixtures containing as impurities acyclic, alicyclic, heterocyclic compounds, sulfur compounds, organic or inorganic, or phenols which comprises adding sufficient active chlorinating agent to react with the impurities in the presence of a chlorinating catalyst, the aromatic hydrocarbons being substantially unattacked.

20. The process of purifying crude coal tar distillates which comprises partially chlorinating the distillates in the presence of a chlorine carrier.

21. The process of recovering highly purified aromatic hydrocarbons from crude mixtures containing as impurities acyclic, alicyclic, heterocyclic compounds, sulfur compounds, organic or inorganic, or phenols which comprises adding sufficient active chlorinating agent to react with the impurities in the presence of a chlorine carrier, the aromatic hydrocarbons being substantially unattacked.

22. The process of purifying crude coal tar distillates which comprises partially chlorinating the distillates in the presence of a chlorine carrier which preferentially catalyzes the chlorination of aliphatic compounds and sulfur compounds.

23. The process of recovering highly purified aromatic hydrocarbons from crude mixtures containing as impurities acyclic, alicyclic, heterocyclic compounds, sulfur compounds, organic or inorganic, or phenols which comprises adding sufficient active chlorinating agent to react with the impurities in the presence of a chlorine carrier which preferentially catalyzes the chlorination of aliphatic, heterocyclic and sulfur compounds, the aromatic hydrocarbons being substantially unattacked.

24. The process of purifying crude coal tar distillates which comprises partially chlorinating the distillates in the presence of a sulfur substance not originally present in the distillates.

25. The process of recovering highly purified aromatic hydrocarbons from crude mixtures containing as impurities acyclic, alicyclic, heterocyclic compounds, sulfur compounds, organic or inorganic, or phenols which comprise adding sufficient active chlorinating agent to react with the impurities while leaving the aromatic hydrocarbons substantially unattacked, the reactions taking place in the presence of a sulfur substance not originally present in the mixture.

26. The process of recovering high grade benzene hydrocarbons from light oil fractions containing them which comprises partially chlorinating in the presence of sulfur substances in addition to those originally present in the mixture and which form no chlorinated compounds of boiling points near those of the hydrocarbons to be recovered and distilling off the unreacted benzene hydrocarbons.

27. The process of purifying crude coal tar distillates containing homologues of benzene which comprises partially chlorinating under conditions which prevent side chain chlorination.

28. The process of purifying crude coal tar distillates which contain homologues of benzene which comprises partially chlorinating in the presence of sulfur substances not originally present in the distillates and under conditions which prevent side chain chlorination.

29. The process of purifying crude coal tar distillates which contain homologues of benzene which comprises partially chlorinating in the presence of sulfur chloride not originally present in the distillates and under conditions which prevent side chain chlorination.

30. The process of purifying crude coal tar distillates containing solvent naphtha which comprises partially chlorinating in the presence of a sulfur substance which does not form a chlorination product having a boiling point near to the boiling point of the solvent naphtha components.

31. The process according to claim 13 in which liquid chlorine is used as the chlorinating agent.

32. The process according to claim 15 in which liquid chlorine is used as the chlorinating agent.

33. The process according to claim 20 in which liquid chlorine is used as the chlorinating agent.

34. The process according to claim 22 in which liquid chlorine is used as the chlorinating agent.

35. The process according to claim 24 in which liquid chlorine is used as the chlorinating agent.

36. As a new product a partially halogenated crude coal tar distillate.

37. As a new product a partially chlorinated crude coal tar distillate.

38. As a new product a crude coal tar distillate in which substantially all components other than aromatic hydrocarbons have been acted upon by halogen while the aromatic hydrocarbons are substantially unattacked.

39. As a new product a crude coal tar distillate in which substantially all of the components other than aromatic hydrocarbons have been acted upon by chlorine while the aromatic hydrocarbons are substantially unattacked.

40. As new products rectified crude coal tar distillates which have been purified by partial halogenation of the crude distillate, said products containing at least one reaction product with halogen of at least one impurity originally present in the crude distillate.

41. As new products aromatic hydrocarbons prepared by treating crude coal tar distillates with halogen in amounts sufficient to react with impurities but insufficient to substantially attack aromatic hydrocarbons and distilling, said products being characterized by the fact that they contain small amounts of halogen reacted impurities and that they are suitable for use in catalytic hydrogenations without further purification and without damage to the catalyst.

Signed at St. Louis, Missouri, this 1st day of February, 1926.

ALPHONS O. JAEGER.